US012003046B2

(12) United States Patent
Batel et al.

(10) Patent No.: US 12,003,046 B2
(45) Date of Patent: Jun. 4, 2024

(54) ANTENNA NETWORK WITH DIRECTIVE RADIATION

(71) Applicant: Commissariat à l'énergie atomique et aux énergies alternatives, Paris (FR)

(72) Inventors: Lotfi Batel, Grenoble (FR); Lionel Rudant, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 17/643,713

(22) Filed: Dec. 10, 2021

(65) Prior Publication Data

US 2022/0231417 A1 Jul. 21, 2022

(30) Foreign Application Priority Data

Dec. 11, 2020 (FR) ..................................... 20 13099

(51) Int. Cl.
*H01Q 9/36* (2006.01)
*H01Q 1/24* (2006.01)
(Continued)

(52) U.S. Cl.
CPC ............... *H01Q 9/36* (2013.01); *H01Q 1/247* (2013.01); *H01Q 5/335* (2015.01); *H01Q 9/0421* (2013.01); *H01Q 1/32* (2013.01)

(58) Field of Classification Search
CPC ............ H01Q 1/288; H01Q 1/32; H01Q 5/00; H01Q 5/10; H01Q 5/20; H01Q 5/28; H01Q 5/30; H01Q 5/307; H01Q 5/314; H01Q 5/321; H01Q 5/328; H01Q 5/335; H01Q 9/0421; H01Q 9/0428; H01Q 9/0442;
(Continued)

(56) References Cited

U.S. PATENT DOCUMENTS

| | | | | |
|---|---|---|---|---|
| 5,300,936 A * | 4/1994 | Izadian | .................... | H01Q 1/32 343/741 |
| 6,618,016 B1 * | 9/2003 | Hannan | .................. | H01Q 13/10 343/705 |

(Continued)

OTHER PUBLICATIONS

French Preliminary Search Report issued Aug. 26, 2021 in French Application 20 13099 filed on Dec. 11, 2020, 3 pages (with English Translation of Categories of Cited Documents).

*Primary Examiner* — Ab Salam Alkassim, Jr.
*Assistant Examiner* — Leah Rosenberg
(74) *Attorney, Agent, or Firm* — Oblon, McClelland, Maier & Neustadt, L.L.P.

(57) ABSTRACT

A directional antenna network adapted to operate in at least one predetermined frequency band, which includes at least one pair of metal antennas formed by a first metal antenna and a second metal antenna, the second metal antenna being sequentially rotated by a predetermined angle of rotation relative to the first metal antenna, a load circuit, with each metal antenna connected to the load circuit, and a monopole antenna, having a central position in the antenna network, connected to the load circuit. The metal antennas and the monopole antenna are arranged on a ground plane and coupled, with the load circuit being parameterized to provide radiation, the monopole antenna having a destructive contribution of a magnetic transverse radiation mode to obtain radiation by the at least one pair of metal antennas of selected circular polarization.

11 Claims, 9 Drawing Sheets

(51) Int. Cl.
*H01Q 5/335* (2015.01)
*H01Q 9/04* (2006.01)
*H01Q 1/32* (2006.01)

(58) Field of Classification Search
CPC .. H01Q 9/30; H01Q 9/40; H01Q 9/42; H01Q 21/20; H01Q 21/24; H01Q 21/245; H01Q 21/26
See application file for complete search history.

(56) References Cited

U.S. PATENT DOCUMENTS

| | | | | |
|---|---|---|---|---|
| 7,450,082 | B1 | 11/2008 | Lopez | |
| 9,917,376 | B2 * | 3/2018 | Belmkaddem | H01Q 23/00 |
| 2006/0220959 | A1 | 10/2006 | Ying | |
| 2008/0143602 | A1 * | 6/2008 | Mak | H01Q 3/24 342/374 |
| 2018/0337458 | A1 * | 11/2018 | Rodríguez | H01Q 1/2266 |
| 2020/0106158 | A1 * | 4/2020 | Gomez Angulo | G06F 1/1698 |
| 2021/0159600 | A1 * | 5/2021 | Rodríguez | H01Q 9/0442 |
| 2021/0184358 | A1 | 6/2021 | Rodriguez et al. | |

* cited by examiner

ANTENNA NETWORK WITH DIRECTIVE RADIATION

The present application claims priority from French Patent Application number FR 20 13099 filed Dec. 11, 2020, the entire disclosure of which is incorporated by reference herein.

FIELD OF THE INVENTION

The present invention relates to an antenna network with directive radiation adapted to operate in at least one predetermined frequency band.

The invention is in the communications field in which directive radiation is desired, and more particularly in the field of satellite geolocation and navigation communication.

BACKGROUND OF THE INVENTION

A global navigation satellite systems (GNSS) system comprises a satellite signal receiver with a receiving antenna or antenna network that has good directivity, maximum gain in the zenith direction for receiving satellite signals, and right-hand circular polarization, also called RHCP. For various practical applications, GNSS receivers are carried on a carrier such as a motor vehicle or any other type of vehicle.

In the state of the art, ceramic antennas are known, such as patch antennas on a ceramic substrate, which are miniature and make directive radiation and right-hand circular polarization radiation possible, which makes them suitable for application in GNSS systems. Nevertheless, the cost of the material forming such antennas is incompressible, which limits the large-scale deployment of multi-band GNSS that requires ceramic patches superimposed on each other.

Multi-wire antennas with helical geometry are also known, where the wires are wound around a cylinder of dielectric material and rest on a reflector plane. In such an antenna structure, the number of antenna wires makes operation in several frequency bands possible, for communication with several satellites. However, the antenna takes up a lot of space and can reach heights of about 20 cm.

The object of the invention is to overcome the disadvantages of the state of the art by proposing an antenna network with directive radiation, in circular polarization, in particular in right circular polarization, which is both compact and low cost.

SUMMARY OF THE INVENTION

To this end, the invention proposes an antenna network with directive radiation, adapted to operate in at least one predetermined frequency band, which comprises:

- at least one pair of metal antennas formed of a first metal antenna and a second metal antenna, the second metal antenna being positioned in sequential rotation by a predetermined angle of rotation relative to the first metal antenna,
- a load circuit, each metal antenna being connected to said load circuit,
- a monopole antenna, having a central position in the antenna network, connected to said load circuit,
- said metal antennas and said monopole antenna being arranged on a ground plane and coupled, the loading circuit being parameterized to make radiation in which the monopole antenna has a destructive contribution of a magnetic transverse radiation mode, making it possible to obtain a radiation of selected circular polarization by said at least one pair of metal antennas.

Advantageously, the proposed antenna network is made from metal antennas with a low manufacturing cost, and the proposed arrangement makes it possible to achieve the directivity and circular polarization while making it possible to make a compact antenna.

The antenna network according to the invention can also have one or more of the following features, taken independently or in any technically feasible combination.

The circular polarization chosen is a right-hand circular polarization.

The antenna network comprises two pairs of metal antennas, each pair of metal antennas being adapted to operate in an associated frequency band, so as to make a dual frequency band antenna.

A first pair of metal antennas is formed by two antennas each having a radiating element of a first length, and a second pair of resonant metal antennas is formed by two antennas each having a radiating element of a second length, the second length being different from the first length.

For the or each pair of metal antennas, the predetermined rotation angle is a 90° (90 degrees) angle.

The antenna network comprises four pairs of metal antennas, symmetrically arranged about a center of rotation of said sequential rotation.

Each metal antenna is an inverted F planar antenna.

Each pair of metal antennas has two inverted F planar metal antennas of the same dimensions, each inverted F planar metal antenna having a folded capacitive roof connected to the ground plane by a short circuit and a metal feed strand connected to said load circuit.

Each metal antenna of a pair of metal antennas is made by printing on a board.

The load circuit is composed of passive components of capacitive, inductive, resistive nature or a combination of these components.

According to another aspect, the invention relates to a satellite geolocation system comprising an antenna network as briefly described above.

BRIEF DESCRIPTION OF THE DRAWINGS

Further features and advantages of the invention will be apparent from the description given below, by way of indication and not in any way limiting, with reference to the appended Figures, among which.

DETAILED DESCRIPTION OF EMBODIMENTS

A first embodiment of an antenna network according to the invention, forming a micro antenna network, is illustrated with reference to FIGS. 1 to 3.

Figure 1:
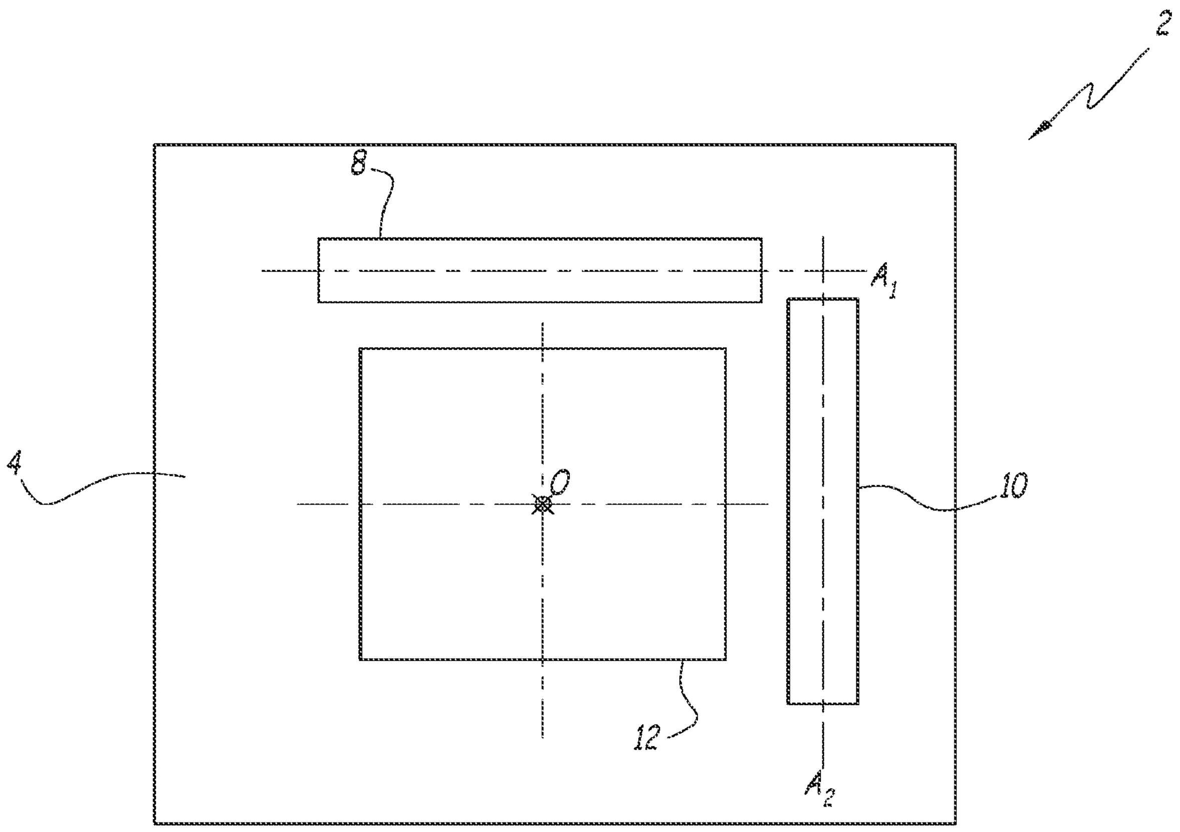
FIG. 1 shows schematically an antenna network according to a first embodiment.

FIG. 1 shows schematically, viewed from above, an antenna network 2 according to a first embodiment of the invention.

Figure 2:
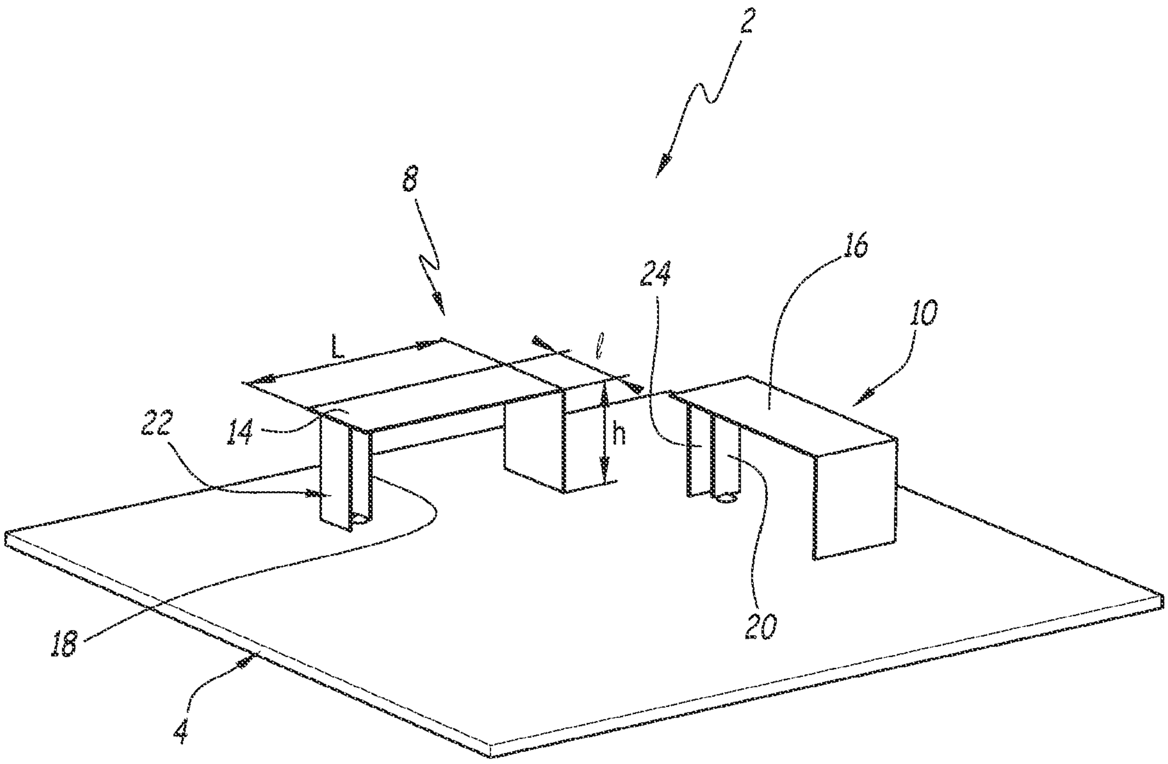
FIG. 2 illustrates the geometry of a part of the antenna network according to the first embodiment.
Figure 3:
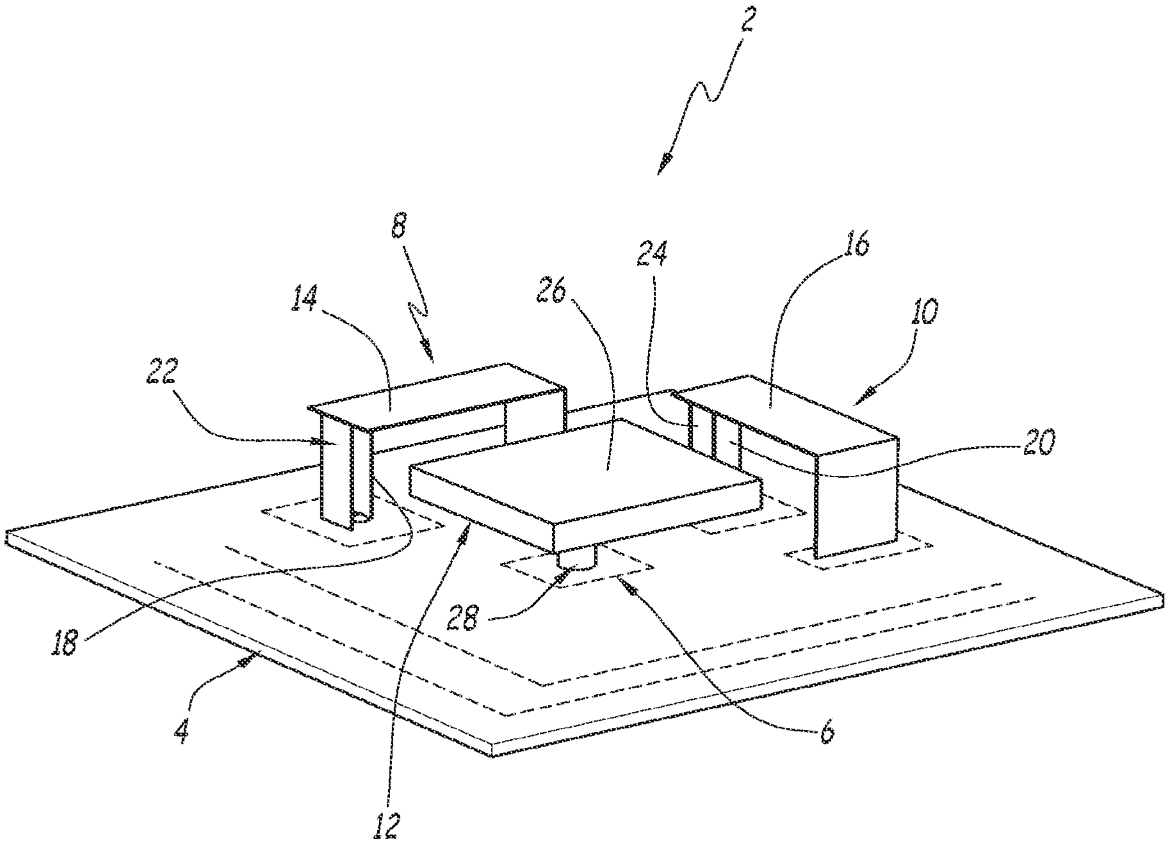
FIG. 3 illustrates the geometry of the antenna network according to the first embodiment.

FIGS. 2, 3 show schematically the antenna network 2 in perspective, in an orthogonal 3D reference frame (X, Y, Z).

The antenna network 2 has a ground plane 4, on which a load circuit 6 of the antenna network is printed.

The antenna network 2 is configured to operate in a predetermined frequency band centered on a given center frequency. For a GNSS system, the satellite transmission frequencies are L1=1,575.42 MHz and L2=1,227.60 MHz. For example, the antenna network 2 has a center frequency of 1575 MHz.

The antenna network 2 in the embodiment of FIG. 1 includes a pair of metal antennas formed by a first metal antenna 8 and a second metal antenna 10.

Each metal antenna 8, 10 comprises a radiating element whose central resonant frequency belongs to the selected frequency band.

In one embodiment, each said first metal antenna 8 and second metal antenna 10 is a planar inverted F-antenna antenna (PIFA). PIFA antennas are classically used in the field of radio communications.

In this embodiment, the two PIFA antennas 8, 10 are structurally identical.

The second PIFA antenna 10 is sequentially rotated relative to the first PIFA antenna 8, orthogonally to the first PIFA antenna 10.

In this embodiment, each PIFA antenna 8, 10 extends along a respective axis A1, A2, the antennas being positioned so that the axes A1, A2 are perpendicular.

Sequential rotation is defined as rotation in a predetermined direction of rotation, about a predetermined center of rotation and by an associated selected angle of rotation. Preferably, the center of rotation is a point located substantially at the center of the antenna array, such as a point located on an axis perpendicular to the ground plane 4, which intersects the ground plane at the center of the antenna array.

Thus, the second PIFA antenna placed orthogonally to the first PIFA antenna corresponds to a sequential rotation of equal rotation angle 90° from the initial position of the first PIFA antenna 8. The center of rotation is referenced O in FIG. 1; it is a point located substantially at the center of the antenna network 2.

According to variants, it is possible to arrange a larger number of metal antenna pairs in this way, such as PIFA antennas with each antenna pair comprising two antennas sequentially rotating an associated rotation angle, forming several rotation sequences around the center O of the antenna network.

The antenna network 2 further comprises a monopole antenna 12, which is placed at the center of the antenna network. In other words, the monopole antenna 12 has the point O as its center of symmetry, which is placed substantially at the center of the antenna network 2.

Each PIFA antenna 8, 10 comprises a folded capacitive roof 14, 16, and a metal feed strand 18, 20. The capacitive roof 8, 10 is connected to the ground plane 4 by a short circuit 22, 24.

In one embodiment, the dimensions of the PIFA antennas 8, 10 are as follows: length L=20 mm; width l=6 mm and height h=10 mm.

The monopole antenna 12 comprises a capacitive roof 26 and a metal feed strand 28, which extends in the vertical direction when the ground plane 4 is horizontal in the illustrated embodiment.

In the illustrated example, the capacitive roof 26 of the monopole antenna 12 has a square or rectangular geometric shape in the plane of the antenna network 2. In variants, the capacitive roof 26 of the monopole antenna 12 has a different geometric shape, such as a disk shape or any other chosen geometric shape.

According to an alternative embodiment, the metal antennas 8, 10 are patch type antennas (also called "microstrip antennas"), which operate in an analogous manner. In this embodiment, each antenna 8, 10 comprises a capacitive roof and a feed strand 18, 20. Differently from PIFA antennas, in the embodiment with patch antennas, there is no short circuit 22, 24.

Each of the feed strands 18, 20, 28 is connected to the load circuit 6 which is printed on the ground plane 4. The load circuit 6 is illustrated schematically in FIG. 3, in dashed lines.

The metal antennas 8, 10, 12 are coupled, and the load circuit 6 is optimized to obtain an adequate radiation.

In the antenna network 2, the metal antennas 8, 10 are resonant and the monopole antenna 12 is non-resonant, its radiation being used to cancel the unwanted radiation generated by the metal antennas of the antenna pair 8, 10, as explained below.

Figure 4:
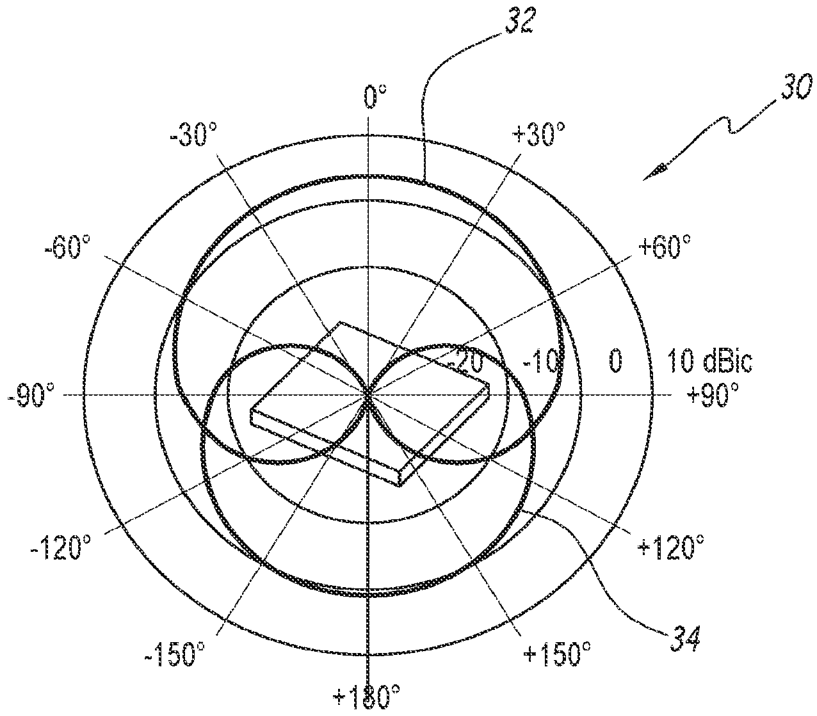
FIG. 4 illustrates a reference radiation pattern for an application in a satellite-based geolocation system.

Preferably, the load circuit 6 is a load circuit with load impedances calculated by a constrained calculation method, as described in patent EP2840654 B1, to achieve a radiation target shown in FIG. 4. This method is based on the use of the spherical wave decomposition principle, which decomposes the electromagnetic field radiated by each antenna into a series of modes, taking into account the coupling between the different antennas of the antenna array. This optimization tool makes it possible to apply a weighting on the series of radiation modes by amplifying the desired modes and attenuating the undesired modes. The optimal weighting obtained is then converted into complex impedances, making it possible to make the antenna loading circuit.

The antenna network 2 is configured for operation in a frequency band for receiving signals from satellites for application in a GNSS receiver. It is desired that the antenna network has a directional operation in a given direction, i.e. at the zenith, in right circular polarization.

The desired radiation is broken down into two radiation modes, the transverse electric mode $TE_{-11}$ and the transverse magnetic mode $TM_{-11}$ respectively. In an operation suitable for the intended application, these two radiation modes have the same amplitude and have phases of 0° and 180° respectively, or, in other words, are in phase opposition. The other radiation modes, $TE_{10}$ and $TE_{11}$ and $TM_{10}$ and $TM_{11}$ respectively, are zero.

The association of the transverse electric, $TE_{-11}$ and transverse magnetic, $TM_{-11}$ modes of radiation result in a radiation pattern with maximum right-hand circular polarization (RHCP) gain at the zenith and minimum left-hand circular polarization (LHCP) gain at the zenith.

A radiation pattern 30, referred to as a baseline radiation pattern, is shown in FIG. 4. The radiation pattern shows the angular distribution of radiated power depending on the azimuth Φ. The power is expressed in circular isotropic decibels (dBic).

The radiation pattern 30 comprises the right-hand circularly polarized (RHCP) gain 32, maximum at $\Phi=0°$ (zenith) and the left-hand circularly polarized (LHCP) gain 34, maximum at $\Phi=180°$.

A PIFA metal antenna fed by an electric current generates the electric transverse modes $TE_{-11}$, $TE_{11}$ and the magnetic transverse modes $TM_{-11}$, $TM_{10}$ and $TM_{11}$.

Advantageously, due to the geometric arrangement, in sequential rotation, of the two metal PIFA antennas 8, 10 of the antenna network pair 2, the electric transverse mode radiations $TE_{11}$ of two antennas are in phase opposition, and thus cancel each other out when they are at the same amplitude. Similarly, the magnetic transverse mode $TM_{11}$ radiations of two antennas are in phase opposition, and thus cancel each other out when they are at the same amplitude.

The transverse electric $TE_{-11}$ and transverse magnetic $TM_{-11}$ modes of the two sequentially rotating PIFA antennas are in phase and are added.

There remains a magnetic transverse mode radiation $TM_{10}$, which has a phase at 90° for the first metal PIFA antenna 8, for example, and at 180° for the second metal PIFA antenna 10. Advantageously, the monopole antenna 12 emits a magnetic transverse mode radiation $TM_{10}$, which, thanks to the load circuit optimization, is oriented to compensate the magnetic transverse mode radiation $TM_{10}$ of the metal PIFA antennas 8, 10. Thus, the monopole antenna 12 has a destructive contribution; the magnetic transverse mode radiation $TM_{10}$ is cancelled.

The adjustment of the amplitudes and phases of the radiation modes generated by the metal antennas 8, 10, 12 is done by parameterization of the load circuit 6. In one embodiment, this load circuit is composed of passive components of a capacitive, inductive or resistive nature, or of a combination of these components. The load circuit parameters are calculated using the method described in patent EP 2 840 654 B1.

For example, in one concrete embodiment, an antenna network 2 is developed for a GNSS geolocation and navigation system, for an on-board receiver on a motor vehicle. The antenna network has the following dimensions: a height of 10 mm and a square support of side 35 mm, for operation at the center frequency of 1.575 GHz. The antenna network is optimized to radiate with a maximum gain of 2 dBic at the zenith, with an axial ratio of 1 dB and a RHCP polarization in the L1 frequency band around 1.575 GHz.

The loading circuit 6 is such that the first metal PIFA antenna 8 is fed by a radio frequency (RF) source of impedance 500, the second metal PIFA antenna 10 is loaded with a capacitance of 2.7 pF and the monopole antenna 12 is loaded with a capacitance of 10 pF. These load values are determined for the adjustment of the amplitudes and phases of the radiation modes present in the antenna array, so as to keep the $TE_{-11}$, $TM_{-11}$ modes and to cancel the $TM_{10}$ magnetic transverse mode radiation, as explained above.

Figure 5:
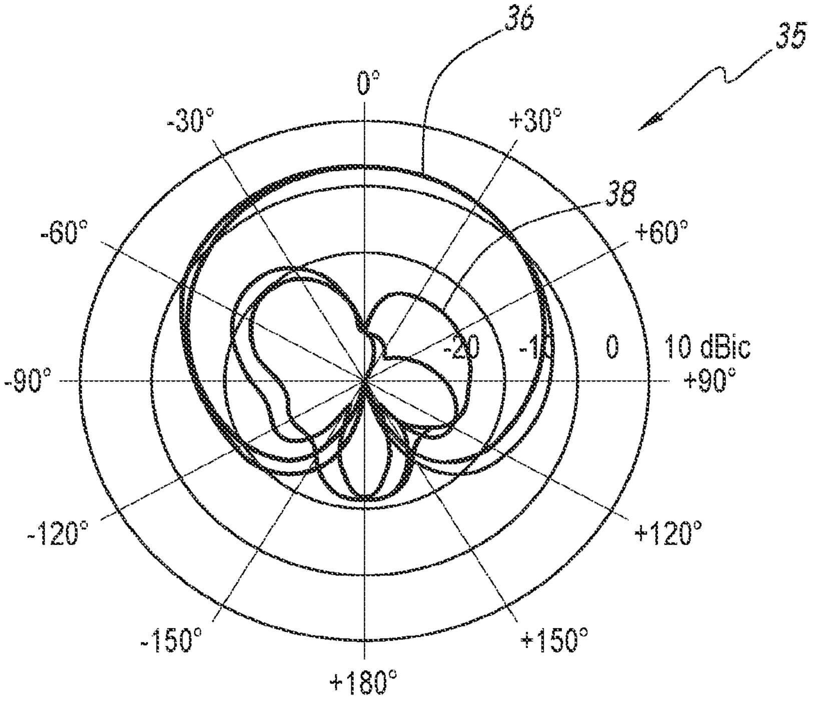
FIG. 5 illustrates a radiation pattern made by an antenna network arrangement according to the first embodiment.

FIG. 5 shows the radiation pattern 35 obtained by the antenna network 2 made according to this concrete embodiment, this pattern including the right-hand circularly polarized (RHCP) gain 36 and the left-hand circularly polarized (LHCP) gain 38. As can be seen, the RHCP gain is maximum at =0° (at zenith), and is comparable to the RHCP gain 32 of the reference radiation pattern 30.

According to variants, the antenna network comprises more than one pair of resonant metal antennas.

Figure 6:
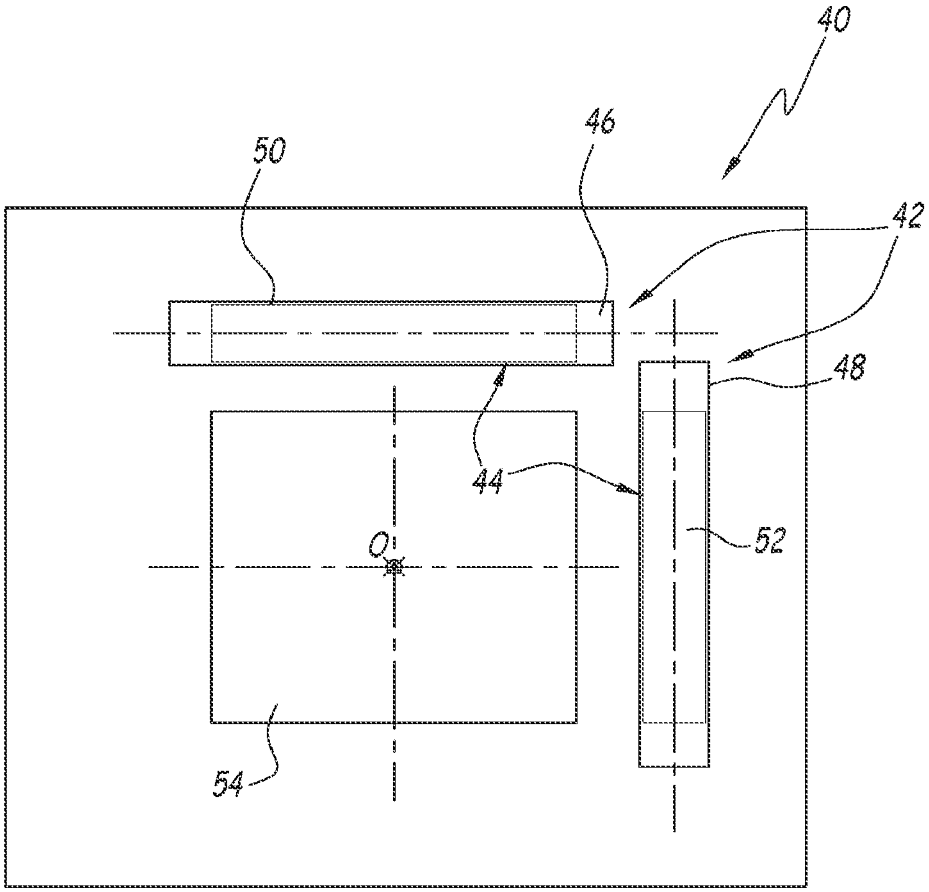
FIG. 6 shows schematically an antenna network according to a second embodiment.

For example, as illustrated in FIG. 6, an antenna network 40 according to a second embodiment of the invention includes two pairs 42, 44 of metal antennas, a first pair 42, consisting of two orthogonally positioned, sequentially rotating metal antennas 46, 48, and a second pair 44, consisting of two metal antennas 50, 52. In the illustrated embodiment, the two metal antennas 50, 52 of the second pair 44 have different dimensions than the dimensions of the antennas 46, 48 of the first pair 42, and are respectively positioned above the antennas of the first pair. Thus, the two metal antennas of the first pair have a resonant element of a first length, and the two metal antennas of the second pair have a resonant element of second length, smaller than the first length, to target a lower frequency band dedicated to GNSS, for example, such as the L2 or L5 band. For example, the metal antennas 46, 48, 50, 52 are PIFA antennas, as described in the first embodiment.

The antenna network also includes a monopole antenna 54, centered relative to the center of symmetry O of the antenna network 40 and non-resonant.

Advantageously, in this embodiment, the first pair 42 of antennas is configured to operate in a first frequency band, such as the L1 band, and the second pair 44 of antennas is configured to operate in a second frequency band, such as the L2 band. The load circuit (not visible in FIG. 6) is set up to perform dual frequency band operation of these antenna pairs.

Figure 7:
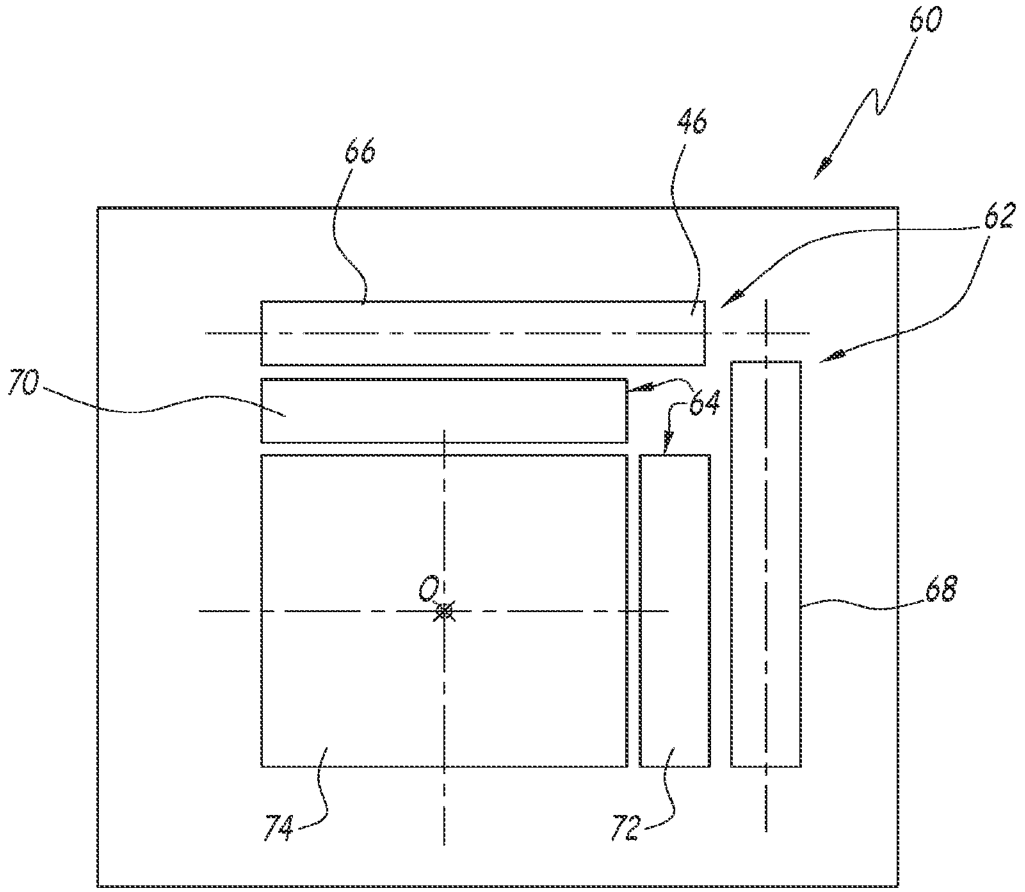
FIG. 7 shows schematically an antenna network according to a third embodiment.

According to a third embodiment, shown in FIG. 7, an antenna network 60 comprises two pairs 62, 64 of metal antennas, a first antenna pair 62, consisting of two orthogonally positioned, sequentially rotating metal antennas 66, 68, and a second antenna pair 64, consisting of two sequentially rotating metal antennas 70, 72, also positioned with a rotation angle equal to 90°.

In the illustrated embodiment, the two metal antennas 70, 72 of the second pair 64 have different dimensions than the dimensions of the antennas 66, 68 of the first pair 62, and are respectively positioned at a translational offset from the antennas 66, 68 of the first pair 62.

The two metal antennas 66, 68 of the first pair 62 have a resonant element of a first length, and the two metal antennas 70, 72 of the second pair 64 have a resonant element of a second length, less than the first length for example, to target a lower frequency band dedicated to GNSS, such as the L2 or L5 band. For example, the metal antennas 66, 68, 70, 72 are PIFA antennas, as described in the first embodiment.

The antenna network also includes a monopole antenna 74, centered relative to the center of symmetry O of the antenna network 60, and non-resonant.

The load circuit (not visible on FIG. 7) is parameterized to conduct a dual frequency band operation of these antenna pairs.

Figure 8:
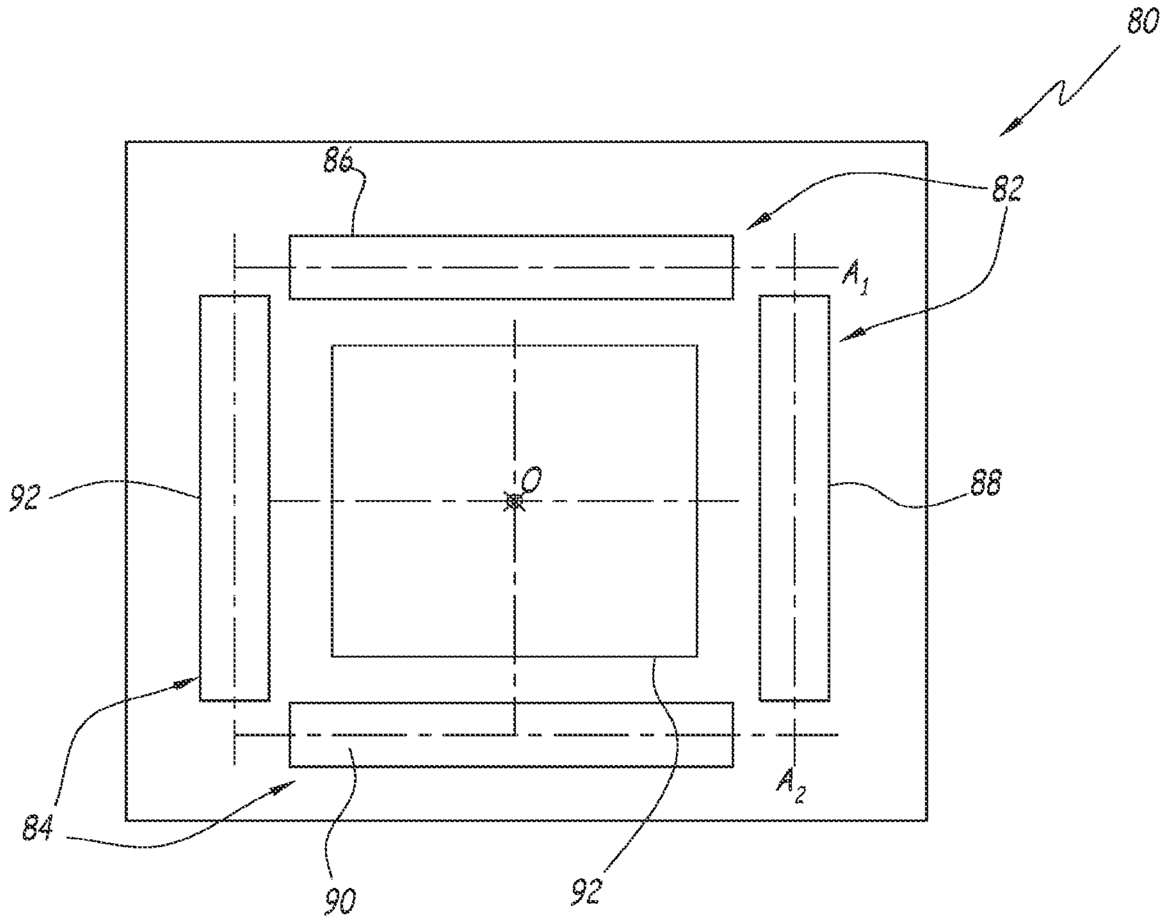
FIG. 8 shows schematically an antenna network according to a fourth embodiment.

According to a fourth embodiment, illustrated in FIG. 8, the antenna network 80 comprises two pairs of antennas 82, 84, arranged symmetrically relative to the point O which is located substantially at the center of the antenna network. In this embodiment, the first pair of antennas 82 is composed of two metal antennas 86, 88 sequentially rotated at 90° rotation angle, and the second pair of antennas 84 is composed of two metal antennas 90, 92, also positioned sequentially rotated at 90° rotation angle. In other words, the two pairs of antennas are arranged so that the second pair of antennas is rotated 180° relative to the first pair of antennas. The metal antennas 86, 88, 90, 92 are structurally identical; they are PIFA antennas, for example. The resulting Antenna network 80 is a centrally symmetrical antenna array. The antenna network 80 further comprises a monopole antenna 94. Depending on the chosen parameterization of the associated load circuit (not shown), the antenna network 80 is adapted to operate in one or two frequency bands.

Figure 9:
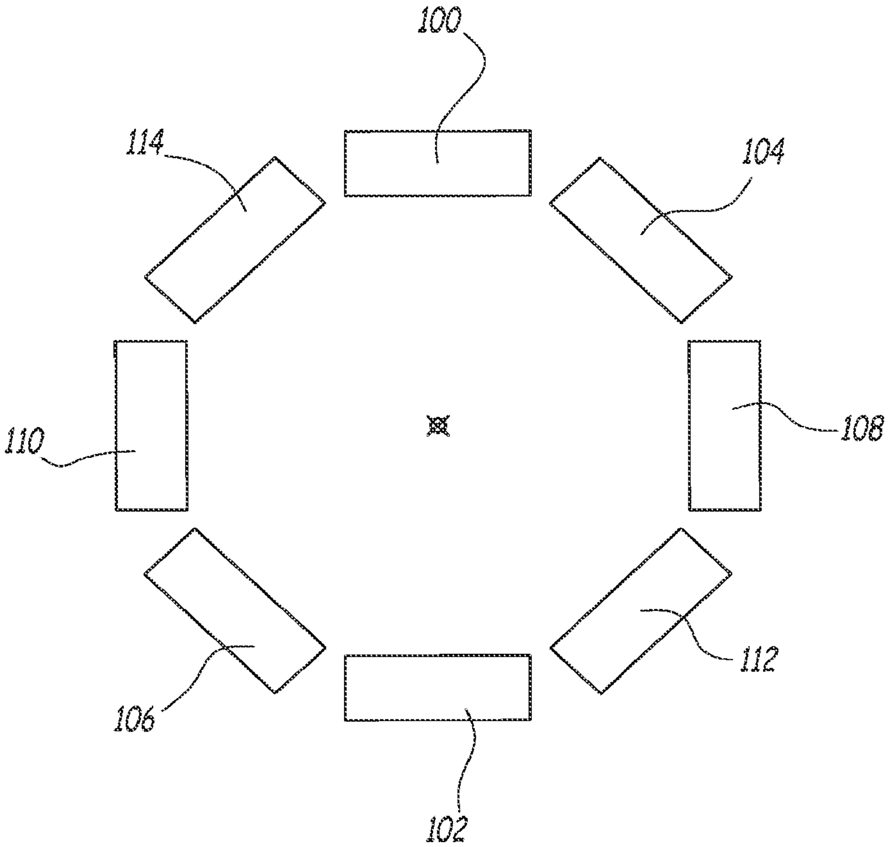
FIG. 9 shows schematically a four pair arrangement of sequentially rotating antenna.

FIG. 9 schematically illustrates an arrangement of four sequentially rotating antenna pairs, forming a circularly rotating antenna network structure. This arrangement comprises a first pair of antennas 100, 102, sequentially rotated at an angle of 180° about point O, a second pair of antennas 104, 106, sequentially rotated at an angle of 180° about point O, a third pair of antennas 108, 110, sequentially rotated at an angle of 180° about point O, a fourth pair of antennas 112, 114, sequentially rotated at an angle of 180° about point O. In this arrangement, the second pair of antennas is rotated 45° relative to the first pair of antennas, the third pair of antennas is rotated 45° relative to the second pair of antennas, and the fourth pair of antennas is rotated 45° relative to the third pair of antennas. The antennas 100, 102, 104, 106, 108, 110, 112 and 114 are metal PIFA antennas, for example, and their dimensions are chosen to form a substantially circular structure. Advantageously, by adding a monopole antenna substantially centered on point O and a suitably parameterized load circuit, an antenna network suitable for providing directive radiation in right-hand circular polarization is formed. The size and shape of the monopole antenna (not shown in FIG. 9) is chosen to suit the type of radiation required.

The example in FIG. 9 has 4 pairs of sequentially rotating antennas. More generally, a larger number N of antenna pairs, for example metal PIFA antennas, is used.

According to another embodiment, the antenna network is composed of metal antennas printed on a dedicated board or printed circuit board (PCB). Advantageously, in this embodiment, the dimensions of the antenna network are further reduced depending on the permittivity or permeability value of the substrate.

Of course, combinations of the above-described embodiments are possible.

The invention has been described above according to several embodiments, more particularly including metal PIFA antennas, since the use of such antennas makes it possible to obtain a particularly compact antenna network.

More generally, the invention applies with other types of metal antennas, such as for example patch antennas, which operate similarly and can be optimized for a similar operation as described above, by parameterizing the load circuit to provide radiation in which the monopole antenna has a destructive contribution of a magnetic transverse radiation mode, making it possible to obtain a radiation of selected circular polarization by said at least one pair of metal antennas.

Advantageously, an antenna network according to the invention makes it possible to make circularly polarized directive radiation with a small footprint and low manufacturing cost.

The invention claimed is:

1. An antenna network with directive radiation, adapted to operate in at least one predetermined frequency band, comprising:

at least one pair of metal antennas formed of a first metal antenna and a second metal antenna, a monopole antenna having a central position in the antenna network, said metal antennas and said monopole antenna being arranged on a ground plane and coupled to each other, a load circuit, each metal antenna and the monopole antenna being connected to the load circuit and fed with an electric current by the load circuit, the load circuit being composed of passive components of a capacitive, inductive or resistive nature, or of a combination of these components, when fed by the load circuit, each metal antenna emits electric transverse radiation modes and magnetic transverse radiation modes, when fed by the load circuit, the monopole antenna emits a magnetic transverse mode radiation TM10 wherein the second metal antenna being sequentially rotated by a predetermined angle of rotation relative to the first metal antenna, an electric transverse radiation mode emitted by the first metal antenna is cancelled by the electric transverse radiation mode emitted by the second metal antenna;

the load circuit elements are parameterized to provide amplitude and phases of the radiation in which the monopole antenna and the at least one pair of antennas have a destructive interference in a magnetic transverse radiation mode of the at least one pair of antennas, so that the magnetic transverse radiation mode TM10 of the monopole antenna cancels the magnetic transverse radiation mode of the at least one pair of antennas, and therefore the at least one pair of metal antennas is configured for a radiation of selected circular polarization.

2. The antenna network according to claim 1, wherein each metal antenna fed by the load circuit generates the electric transverse modes TE-11, TE11 and the magnetic transverse modes TM-11, TM10 and TM11, wherein the radiation of each metal antenna of a pair are of same amplitude, and wherein in a pair of metal antennas, the second antenna is sequentially rotated by 90° with respect to the first antenna and the electric transverse mode radiations TE11 of two antennas are in phase opposition, and thus cancel each other out, and the magnetic transverse mode TM11 radiations of two antennas are in phase opposition, and thus cancel each other.

3. The antenna network according to claim 2, wherein the load circuit has load capacitance and impedance values chosen for the adjustment of the amplitudes and phases of the radiation modes; so as to keep the TE-11, TM-11 modes and to cancel the TM10 magnetic transverse mode radiation.

4. The antenna network according to claim 1, wherein said selected circular polarization is a right-hand circular polarization.

5. The antenna network according to claim 1, comprising two pairs of metal antennas, each pair of metal antennas being adapted to operate in an associated frequency band so as to provide a dual frequency band antenna.

6. The antenna network according to claim 5; wherein a first pair of metal antennas is formed of two antennas each having a radiating element of a first length, and a second pair of metal antennas, which is a pair of resonant metal antennas, is formed of two antennas each having a radiating element of a second length, the second length being different than the first length.

7. The antenna network according to claim 1, comprising four pairs of metal antennas, symmetrically arranged around a center of rotation of said sequential rotation.

8. The antenna network according to claim 1, wherein each metal antenna is an inverted F planar antenna.

9. The antenna network according to claim 8, wherein each pair of metal antennas comprises two inverted F planar metal antennas of the same dimensions, each inverted F planar metal antenna comprising a folded capacitive roof connected to the ground plane by a short circuit and a metal feed strand connected to said load circuit.

10. The antenna network according to claim 1, wherein each metal antenna of a pair of metal antennas is made by printing on a board.

11. A satellite geolocation system comprising the antenna network according to claim 1.

* * * * *